No. 667,864. Patented Feb. 12, 1901.
H. A. BRADLEY.
APPARATUS FOR MANUFACTURING GAS.
(Application filed Nov. 6, 1899.)
(No Model.)
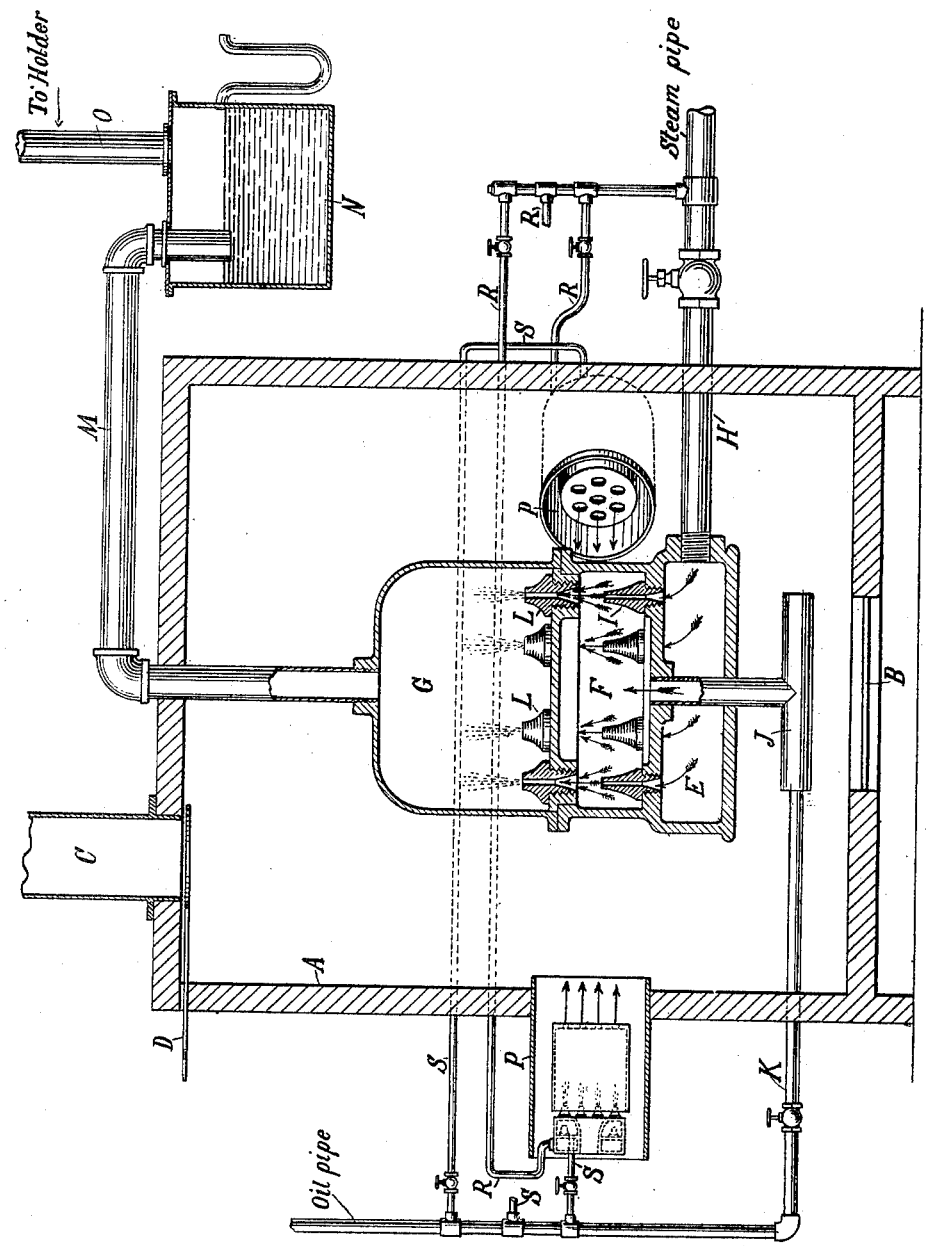
Witnesses:
M. Lawson Dyer.
Benjamin Miller.
Inventor
Henry A. Bradley
by Kerr, Page & Cooper
Att'ys.
THE NORRIS PETERS CO., PHOTO-LITHO., WASHINGTON, D. C.

UNITED STATES PATENT OFFICE.

HENRY A. BRADLEY, OF NEW YORK, N. Y.

APPARATUS FOR MANUFACTURING GAS.

SPECIFICATION forming part of Letters Patent No. 667,864, dated February 12, 1901.

Application filed November 6, 1899. Serial No. 736,067. (No model.)

*To all whom it may concern:*

Be it known that I, HENRY A. BRADLEY, a citizen of the United States, residing in the borough of Manhattan, in the city, county, and State of New York, have invented certain new and useful Improvements in Apparatus for the Manufacture of Gas, of which the following is a specification, reference being had to the drawing accompanying and forming a part of the same.

The invention which forms the subject of my present application for Letters Patent is an improved apparatus for the manufacture of gas for illuminating or heating purposes, the object of the invention being to produce a gas of better quality with less waste of time and material, with less labor, and therefore more economically than is practicable with the means heretofore employed.

In order that the nature of my invention may be readily understood, I would state that it has heretofore been usual to inject into a retort a mixed vapor of steam and hydrocarbon oil and to heat the retort to a high temperature in order to convert the vapor therein into a fixed gas before it is conducted off to the holder through the devices for washing or purifying it. This process therefore involves as its essential steps the vaporization of a hydrocarbon oil by steam, the injection of such vapor into a comparatively spacious chamber or retort, and the conversion of the vapor within the retort into a fixed gas by the application of heat. There are objections to this method of making gas, arising mainly from the difficulty of heating all of the vapor within the retort to the proper temperature, so as to convert it into a fixed gas, and also of maintaining the proper temperature or of regulating the degree of heat applied to the retort as a whole, which objections I have entirely avoided by my improvement.

In carrying out my invention I employ a gas-generator of special construction, the essential characteristics of which are in the following features: There is a chamber or compartment into which a vaporized hydrocarbon oil is introduced. Opening into this chamber is a nozzle or preferably a series of nozzles through which superheated steam is injected. Directly in line with said nozzles and in the wall of the said chamber is a corresponding series of passages or nozzles opening into a second compartment or chamber, the construction or arrangement being such that the steam-jets issuing from the first series of nozzles will pass through the first chamber and the second series of nozzles and in so doing take up and carry with them a portion of the vaporized oil, so that there issues from the second set of nozzles what is practically a gas as distinguished from a vapor.

The generator is constructed of a refractory material and is heated to a high temperature, so that the gas before it passes off is thoroughly fixed. In order to practically carry out the process, the generator is inclosed in a furnace or chamber containing suitable heaters and provided with doors and outlets.

Referring now to the drawing for a description of the apparatus, which is shown in vertical central section, A represents a chamber or furnace of fire-brick or refractory material provided with a door B and a flue or outlet C with a regulating-damper D. The generator is contained in the chamber A and is composed of cylindrical castings, which form three chambers or compartments—a steam-chamber E, an oil-vapor chamber F, and a fixing-chamber G. A steam-pipe H from a boiler conducts steam at high pressure into the chamber E, whence it issues through a series of nozzles I into the chamber F.

J is a receptacle to which oil is supplied by a pipe K and in which the oil is vaporized by applied heat. This receptacle communicates with the chamber F, into which latter the vapor passes.

In line with the nozzles I are passages or nozzles L, through which communication between chambers F and G is established.

A pipe M leads from the chamber G to the water-tank N, in which the gas is washed and from which it is conducted by a pipe O to a suitable holder.

P P represent one or preferably several sources of heat, preferably hydrocarbon-burners of the general character described in a patent granted to me November 3, 1896, No.

570,450. Each of said burners is supplied with steam through a pipe R and with oil through a pipe S. These burners are arranged under or around the generator in any proper manner to evenly heat the same.

With an apparatus constructed as described I carry out the process of manufacturing gas in the following manner: Superheated steam is introduced into the burners P and oil permitted to flow into them. When by this means the gas developed begins to issue from the nozzles of the burners, it is ignited and caused to heat the generator to a temperature of about 1,800° Fahrenheit. When this is done, steam is admitted to the chamber E and oil to the receptacle J. The steam issuing from nozzles I and passing through the passages or nozzles L tends to produce a partial vacuum in the chamber F, which is filled by the vapor of oil, and this issues through nozzles L, together with the decomposed vapor of water in the form of a gas. The process of fixing is completed in the chamber G and the gas carried off as above described. This gas may be used immediately, or it may be stored. If used solely for heating purposes, it requires no purification, but if for illuminating purposes it may be washed or treated in any proper manner.

It will be understood that the various pipes for admitting oil and steam are provided with regulating-cocks by which the flow of oil or amount of steam can be controlled. This enables me to control the action of the burners, so as to regulate very accurately the temperature to which the generator is exposed.

In the drawing I have shown the generator as arranged vertically; but it may be placed in other positions. I would also state that the chamber J in the form shown is not essential, as any other suitable provision may be made for introducing the vapor of oil into the compartment, where it unites with the decomposed vapor of water.

It will be observed that in the apparatus above described the vapors of oil and water are brought into combination while highly heated and under conditions which facilitate their immediate and perfect chemical union. I have found that the gas produced in this way is not only of superior quality, but that it is more economically produced than by vaporizing an oil by superheated steam and then heating the combined vapors to convert them into a fixed gas.

The apparatus constitutes a simple device operating on scientific and, so far as I am aware, entirely new principles in the manufacture of gas either for heating or illuminating. The action of the generator is entirely automatic, and the expensive plants and devices for mechanical power heretofore generally necessary are wholly dispensed with.

Having now described my invention, what I claim is—

1. The combination with an inclosing chamber or furnace, of a gas-generator contained within the same and comprising a chamber into which oil-vapor is introduced, a fixing-chamber and means for forcing steam through the oil-vapor chamber into the fixing-chamber, one or more hydrocarbon-burners for heating the generator, and a receptacle in which the oil is vaporized by applied heat, connected with the said oil-vapor chamber, as set forth.

2. The combination in a gas-generator of a steam-chamber, a fixing-chamber, an intermediate oil-vapor chamber, means for admitting oil-vapor into the last said chamber, a series of nozzles opening from the steam-chamber into the oil-vapor chamber, a corresponding series of nozzles opening from the oil-vapor chamber into the fixing-chamber, means for heating the generator, and a receptacle in which the oil is vaporized by applied heat, connected with the said oil-vapor chamber, as set forth.

3. The combination with an inclosing chamber or furnace, of a gas-generator contained within the same, and comprising a steam-chamber, a fixing-chamber, an intermediate oil-vapor chamber, a receptacle for the vaporization of oil communicating with the oil-vapor chamber, a series of nozzles opening from the steam-chamber into the oil-vapor chamber, a corresponding series of nozzles opening from the oil-vapor chamber into the fixing-chamber, and one or more hydrocarbon-burners for heating the generator, as set forth.

4. In a gas-generator the combination of a chamber for hydrocarbon vapors, means for admitting hydrocarbon vapors to such chamber, a fixing-chamber, means for passing one or more steam-jets through the hydrocarbon-vapor chamber and into the fixing-chamber, the said generator being constructed in such manner that the whole may be heated to a high temperature, and a receptacle in which the oil is vaporized by applied heat, connected with the said oil-vapor chamber, as and for the purpose described.

5. The combination with an inclosing chamber or furnace, of a vaporizer for a hydrocarbon oil, and a gas-generator situated within the inclosing chamber or furnace, and comprising an oil-vapor chamber which is connected with the said oil-vaporizer, a fixing-chamber connected with the oil-vapor chamber, and means for forcing steam through the oil-vapor chamber into the fixing-chamber.

HENRY A. BRADLEY.

Witnesses:
M. LAWSON DYER,
BENJAMIN MILLER.